US009674259B1

(12) United States Patent
Venkatasubramanian et al.

(10) Patent No.: US 9,674,259 B1
(45) Date of Patent: Jun. 6, 2017

(54) SEMANTIC PROCESSING OF CONTENT FOR PRODUCT IDENTIFICATION

(71) Applicant: Amazon Technologies, Inc., Reno, NV (US)

(72) Inventors: Prasanna Srinivasan Venkatasubramanian, Bellevue, WA (US); Jason George McHugh, Seattle, WA (US); Peng Shao, Seattle, WA (US); Tracy Dianne Schultz, Seattle, WA (US); Daniel Robert Rashid, Seattle, WA (US); Michal Maciej Bryc, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 686 days.

(21) Appl. No.: 13/918,419

(22) Filed: Jun. 14, 2013

(51) Int. Cl.
*G06F 15/16* (2006.01)
*H04L 29/08* (2006.01)

(52) U.S. Cl.
CPC ................... *H04L 67/02* (2013.01)

(58) Field of Classification Search
CPC ........... G06Q 30/0623; G06F 17/30011; G06F 17/30684; G06F 17/30663
See application file for complete search history.

(56) References Cited

U.S. PATENT DOCUMENTS

| | | | | |
|---|---|---|---|---|
| 2011/0213655 A1* | 9/2011 | Henkin | ................... | G06Q 30/00 705/14.49 |
| 2011/0264992 A1* | 10/2011 | Vishria | ............. | G06F 17/30887 715/208 |
| 2012/0042338 A1* | 2/2012 | Kitts | ................ | H04N 21/25866 725/35 |
| 2012/0284093 A1* | 11/2012 | Evans | .................. | G06Q 10/107 705/14.1 |
| 2013/0204876 A1* | 8/2013 | Szucs | ................ | G06F 17/30014 707/738 |
| 2013/0246430 A1* | 9/2013 | Szucs | ................ | G06F 17/30011 707/738 |

(Continued)

OTHER PUBLICATIONS

Benson, E., Haghighi, A., and Barzilay, R. "Event Discovery in Social Media Feeds." (2011) In Proceedings of the 49th Annual Meeting of the Association for Computational Linguistics: Human Language Technologies—vol. 1 (pp. 389-398).

(Continued)

*Primary Examiner* — Philip Chea
*Assistant Examiner* — Mohammed Ahmed
(74) *Attorney, Agent, or Firm* — Eversheds Sutherland (US) LLP

(57) ABSTRACT

This disclosure describes systems, methods, and computer-readable media related to semantic processing of content for product identification. Content may be received from a user device. The content may be processed based at least in part on one or more content filters. At least a portion of the processed content may be analyzed with named-entity recognition to identify one or more product references. A confidence score associated with each of the one or more product references may be calculated. Data associated with the one or more product references may be obtained. The data associated with the one or more product references may be transmitted for presentation on the user device.

20 Claims, 5 Drawing Sheets

(56) References Cited

U.S. PATENT DOCUMENTS

2014/0195345 A1\* 7/2014 Lyren ................ G06Q 30/0271
705/14.53
2014/0337174 A1\* 11/2014 Lin .................... G06Q 30/0623
705/26.61

OTHER PUBLICATIONS

Nothman, J., Curran, J. and Murphy, T. "Transforming Wikipedia into Named Entity Training Data." (2008) In Proceedings of the Australasian Language Technology Association Workshop—vol. 6 (pp. 124-132).

Liu, X., Shaodian, Z., Furu, W., and Zhou, M. "Recognizing Named Entities in Tweets." (2011) In Proceedings of the 49th Annual Meeting of the Association for Computational Linguistics: Human Language Technologies—vol. 1 (pp. 359-367).

\* cited by examiner

SEMANTIC PROCESSING OF CONTENT FOR PRODUCT IDENTIFICATION

BACKGROUND

User-generated content is a general term that may be applied to content created by users. Typically, this content is not "professional" quality and may be intended for limited consumption by others. The user-generated content may lack strict formatting, grammar, or spelling. The user-generated content may contain several abbreviations. Usually, user-generated content is not intended as a revenue source by the author. Examples of user-generated content may include text messages, emails, personal photos, web pages, social media content, and videos.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Systems, methods, and computer-readable media in accordance with various embodiments of the present disclosure may provide semantic processing of content for product identification. Content may include any content generated by a user through a user application on a device or professionally developed content, such as news articles. User-generated content may include text messages, emails, social media content, photographs, videos, audio recordings, and any other content that a user might generate.

In some embodiments, the systems and methods described herein may obtain and analyze user-generated content to identify product references so that links to the products may be presented to the user. For example, Abby may receive a text message from Bob stating, "I just finished reading Alice in Wonderland and it was awesome!" Abby's user device, such as a smartphone or tablet, may obtain the user-generated content and transmit the content to a semantic processing server for processing. The semantic processing server may apply one or more content filters to prune the content and identify portions of the content to process. The semantic processing server may then analyze the content to identify references to products. The semantic processing server may identify multiple possible related products and assign each of the identified products a confidence score based on the analysis. The semantic processing server may transmit the list of identified product references, data associated with the product references, and their respective confidence scores to the user device for presentation to the user. Examples of the identified product references from the above example may include a book of Alice in Wonderland, an e-book version of the story, a poster, a song with a title similar to "Alice in Wonderland," or a movie with a title similar to "Alice in Wonderland." In some embodiments, a trailer of a movie or a clip of a song entitled "Alice in Wonderland" or similar title may be identified to be presented to the user.

Illustrative System

Figure 1:
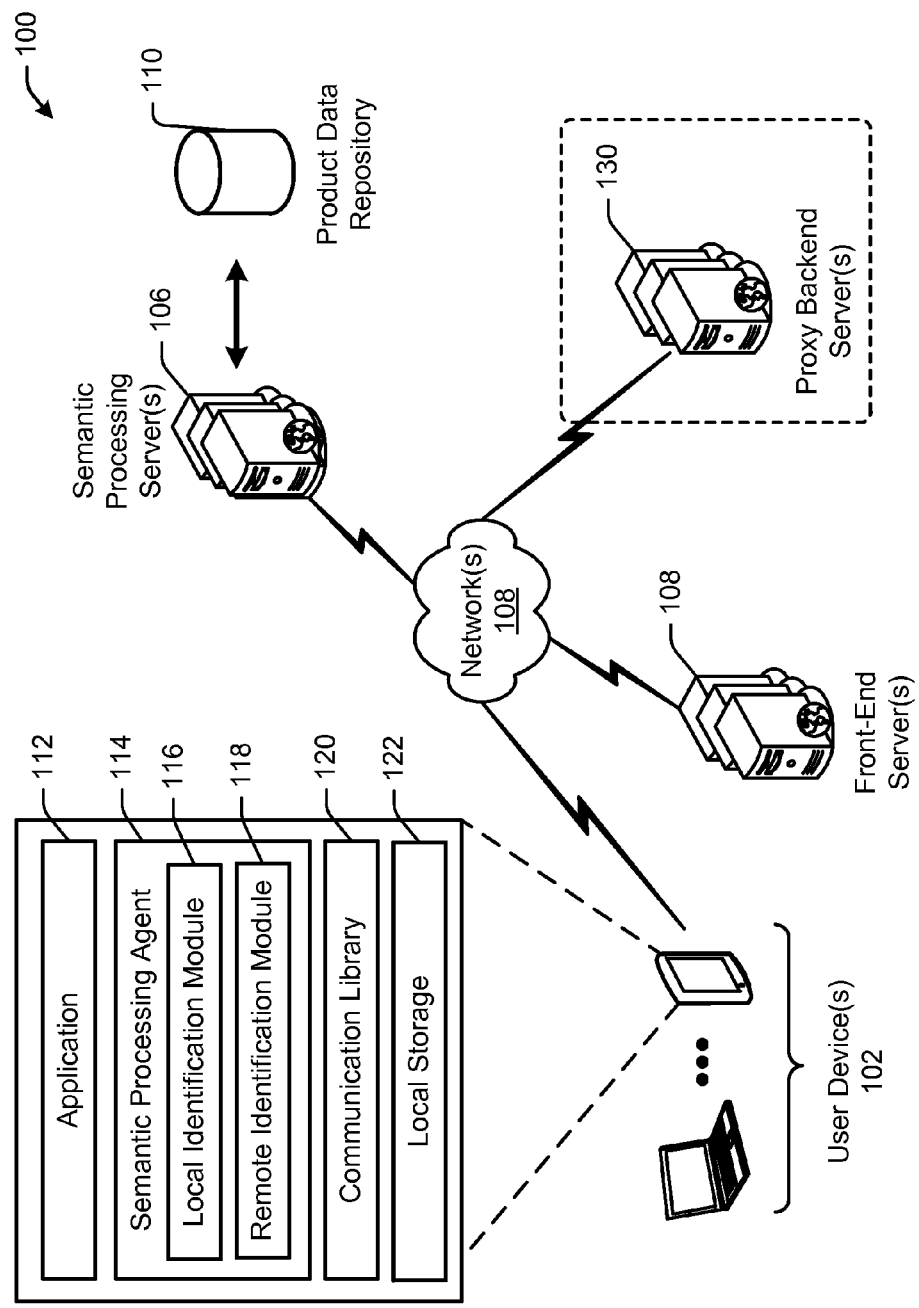
FIG. 1 is a block diagram of an illustrative system for semantic processing of content for product identification in accordance with an embodiment of the disclosure.

FIG. 1 depicts a block diagram of an illustrative system architecture 100 for providing semantic processing of user-generated content for product identification. For illustrative purposes, this disclosure generally describes the methods and systems in the context of content, which may be user-generated content or professionally developed content. This disclosure may generally describe the methods and systems in the context of products, such physical or electronic goods. However, the product references as described herein may include consumer goods, services, additional content and so forth. The systems and methods described herein may be generally applicable to physical goods and services or additional content.

In brief overview, a user device 102 may be in communication with one or more front-end servers 104 over one or more networks 108. The user device 102 may transmit content to the front-end server 104 for semantic processing. The front-end server 104 may communicate with one or more semantic processing servers 106 to process the content. The semantic processing server 106 may process the content and identify one or more product references (e.g., reference of a product or service, such as those that may be available for sale). In some embodiments, data associated with the identified one or more product references may be stored in the product data repository 110. In some embodiments, the front-end server 104 may be optional and the user devices 102 may communicate directly with the one or more semantic processing servers 106. In some embodiments, a user device 102 may optionally be in communication with a proxy backend server 130. For ease of explanation, any of the components depicted in FIG. 1 may be described in the singular hereinafter; however, it should be appreciated that a plural number of any such components may be provided.

In some embodiments, a user device 102 may have one or more applications 112 that may facilitate generation of content, such as user-generated content. The application 112 may transmit the content to the semantic processing agent and receive product references and data associated with the product references for presentation to the user. The application 112 may present the data associated with the product references in the form of a hyperlink to a webpage for the product, a text-bubble overlay of the data associated with the product within or in association with the content, in a pop-up window in association with the content, or the like. Content may include text messages, emails, messages, notes, social media content, web pages, or content associated with a user application. In some embodiments, the user-generated content may include photographs, videos, audio recordings, or graphical data, which may be processed by the semantic processing server 106 or a remote server to identify product references. The user device 102 may also have a semantic processing agent 114, which may utilize a local identification module 116 or remote identification module 118. The local identification module 116 may identify local content to be presented to the user. The remote identification module 118 may determine whether to transmit the content to the front-end server 104 and/or semantic processing server 106 for processing to identify one or more product references. The semantic processing agent 114 may utilize the communication library 120 to communicate with the front-end server 104 and/or semantic processing server 106. In some embodiments, the semantic processing agent 114 may store data received from the front-end server 104 and/or semantic processing server 106 in the local storage 122 for later use.

In an embodiment, a user may select an application (e.g., the application 112) using a user device 102 to generate content. The semantic processing agent 114 may obtain or receive the user-generated content. The semantic processing agent 114 may invoke the local identification module 116 to identify any contact information that may be stored on the user device 102, such as a phone number or email address. The remote identification module 118 may be invoked to facilitate transmission of the user-generated content for further processing to identify one or more product references. In some embodiments, the remote identification module 118 may facilitate communication with one or more remote servers, such as the semantic processing server 106 or the front-end server 104 by invoking the communication library 120. Responsive to receiving data from one or more remote servers, the remote identification module 118 may store the received data to local storage 122 on the user device 102. In some embodiments, the remote identification module 118 may identify a word or phrase from the user-generated content, check the local storage 122 to determine if the word or phrase is associated with a previously identified product. If the remote identification module 118 determines that the word or phrase is associated with a previously identified product, data associated with the previously identified product may be retrieved from the local storage 122 and transmitted to the application 112 for presentation to the user. In some embodiments, the semantic processing agent 114 may facilitate the presentation of the retrieved data associated with the identified product to the user.

In some embodiments, the front-end server 104 may be included in the system as a shield to the remote servers (e.g., semantic processing servers 106). The front-end server 104 may include limited application programming interfaces (APIs) to permit limited access to the semantic processing servers 106. The front-end server 104 may provide security functionality by functioning as a way to externally expose the semantic processing servers 106 without permitting direct access to the semantic processing servers 106.

In some embodiments, a proxy backend server 130 may be optionally included in the system. The proxy backend server 130 may receive a request for content from a user device 102. The proxy backend server 130 may request the content from a remote content server (not pictured), such as a web server. In some embodiments, the proxy backend server 130 may transmit the content obtained from the remote content server to the semantic processing server 106 for processing of the content for product identification. The semantic processing server 106 may process the content to identify one or more product references in the content and transmit the identified product references, data associated with the product references, and any confidence scores calculated in association with the identified product references to the proxy backend server 130. The proxy backend server 130 may augment the content, where the identified product references are decorated to indicate the product references and associated data. For example, the proxy backend server 130 may augment the content by adding hyperlinks at the identified product references within the content. The hyperlinks may be links to a webpage to purchase or learn more about the product. The proxy backend server 130 may then transmit the modified content to the user device 102 for presentation to the user.

The semantic processing servers 106 may have both real-time and non-real-time components. The non-real-time components may include background processing of all the data for the user-generated content, such as a webpage, and storing the information for later use. Such uses may include permitting the semantic processing servers 106 to utilize the previously processed and stored information to identify product references without having to fully process the user-generated content.

The real-time components of the semantic processing servers 106 may include receiving user-generated content, such as a text message, and processing the user-generated content to identify one or more product references. The semantic processing servers 106 may employ named-entity recognition (NER) techniques to identify the one or more product references that may exist in the user-generated content. NER techniques are further discussed below in relation to FIG. 2.

Those of ordinary skill in the art will appreciate that any of the components of the architecture 100 may include alternate and/or additional hardware, software or firmware components beyond those described or depicted without departing from the scope of the disclosure. More particularly, it should be appreciated that software, firmware or hardware components depicted or described as forming part of any of the user device(s) 102, the front end server(s) 104, the proxy backend server(s) 130 and/or the semantic processing server(s) 106, and the associated functionality that such components support, are merely illustrative and that some components may not be present or additional components may be provided in various embodiments. While various program modules (e.g., software modules) have been depicted and described with respect to various illustrative components of the architecture 100, it should be appreciated that the functionality described as being supported by the program modules may be enabled by any combination of hardware, software, and/or firmware.

It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 100 depicted in FIG. 1 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 100 depicted in FIG. 1, or additional functionality.

Figure 2:
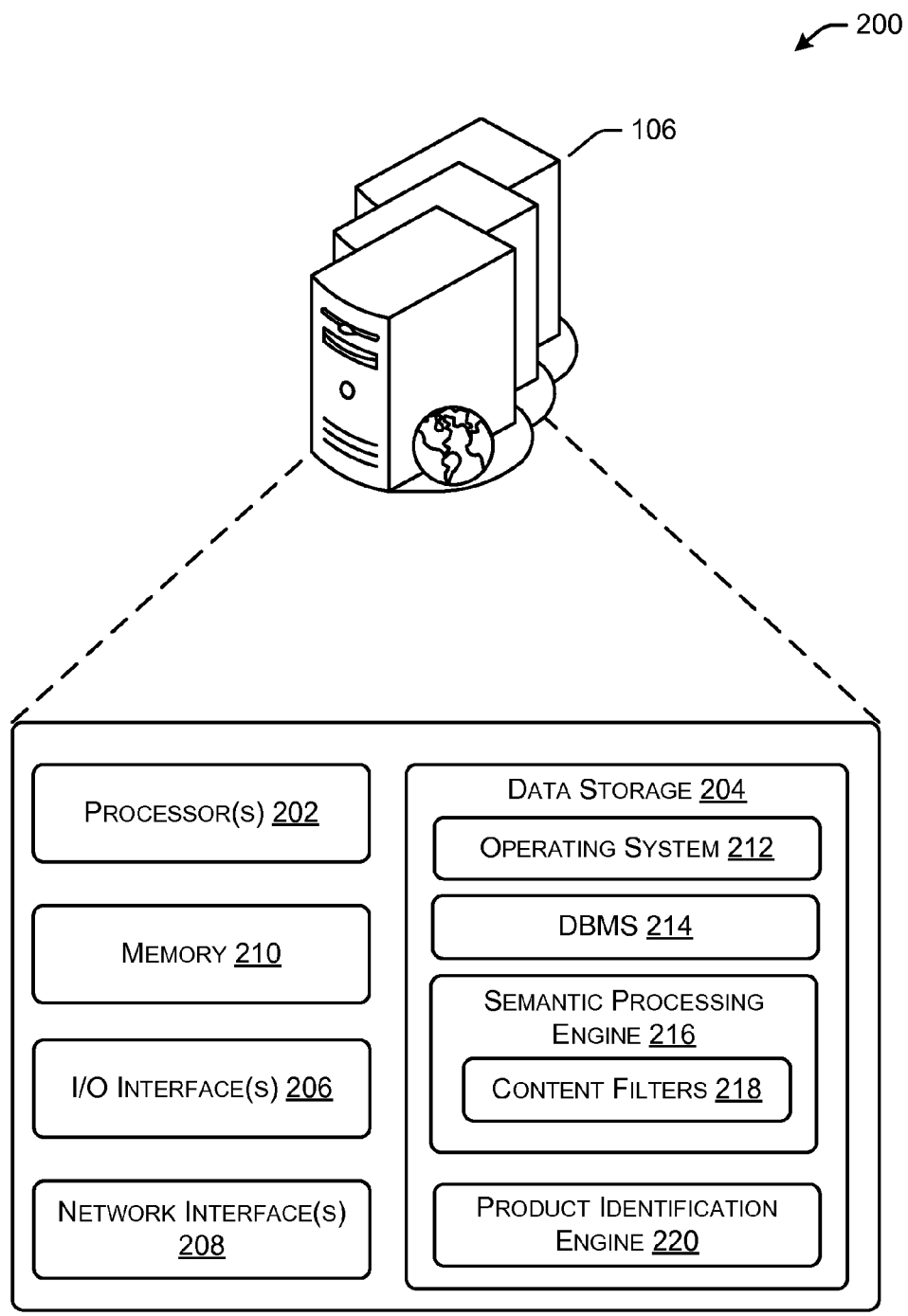
FIG. 2 is a block diagram of illustrative components of a semantic processing server that supports functionality for semantic processing of content for product identification in accordance with an embodiment of the disclosure.

FIG. 2 is a block diagram of illustrative components of a semantic processing server 106. In the illustrative configuration 200 depicted in FIG. 2, the semantic processing server 106 may include one or more processors (processor(s)) 202 and one or more memories 210 (referred to herein generically as memory 210). The processor(s) 202 may include any suitable processing unit capable of accepting digital data as input, processing the input data based on stored computer-executable instructions, and generating output data. The computer-executable instructions may be stored, for example, in the data storage 204 and may include, among other things, operating system software and application software. The computer-executable instructions may be retrieved from data storage 204 and loaded into memory 210 as needed for execution. The processor(s) 202 may be configured to execute the computer-executable instructions to cause various operations to be performed. The processor(s) 202 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 204 may store program instructions that are loadable and executable by the processor(s) 202, as well as data manipulated and generated by the processor(s) 202 during execution of the program instructions. The program instructions may be loaded into memory 210 as needed for execution. Depending on the configuration and implementation of the semantic processing server 106, the memory 210 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 210 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The semantic processing server 106 may further include additional data storage 204 such as removable storage and/or non-removable storage including, but not limited to, magnetic storage, optical disk storage, and/or tape storage. Data storage 204 may provide non-volatile storage of computer-executable instructions and other data. The memory 210 and/or the data storage 204, removable and/or non-removable, are examples of computer-readable storage media (CRSM).

The semantic processing server 106 may further include network interface(s) 208 that facilitate communication between the semantic processing server 106 and other devices of the illustrative system architecture 100 (e.g., the front end server 104 or one more user devices 102) or application software via the network(s) 108. The semantic processing server 106 may additionally include one or more input/output (I/O) interfaces 206 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 204, various program modules, applications, or the like, may be stored therein that may comprise computer-executable instructions that when executed by the processor(s) 202 cause various operations to be performed. The memory 210 may have loaded from the data storage 204 one or more operating systems (O/S) 212 that may provide an interface between other application software (e.g., dedicated applications, a browser application, a web-based application, a distributed client-server application, etc.) executing on the semantic processing server 106 and the hardware resources of the semantic processing server 106. More specifically, the O/S 212 may include a set of computer-executable instructions for managing the hardware resources of the semantic processing server 106 and for providing common services to other application programs (e.g., managing memory allocation among various application programs). The O/S 212 may include any operating system now known or which may be developed in the future including, but not limited to, any mobile operating system, desktop or laptop operating system, mainframe operating system, or any other proprietary or open-source operating system.

The data storage 204 may further include one or more database management systems (DBMS) 214 for accessing, retrieving, storing, and/or manipulating data stored in one or more datastores. The DBMS 214 may use any of a variety of database models (e.g., relational model, object model, etc.) and may support any of a variety of query languages.

The data storage 204 may additionally include various other program modules that may include computer-executable instructions for supporting a variety of associated functionality. For example, the data storage 204 may include one or more semantic processing engines 216 and one or more product identification engines 220. The semantic processing engine 216 may include one or more content filters 218.

The semantic processing engine 216 may include computer-executable instructions that in response to execution by the processor(s) 202 cause operations to be performed including applying one or more content filters 218 to the user-generated content received from the user device 102 or front end server 104. The semantic processing engine 216 may facilitate pruning of the user-generated content based at least in part on the one or more content filters 218 so that only a portion of the user-generated content is processed and analyzed to identify any product references. The content filters 218 may include an adult site filter, a secure site filter, a language identification filter, and/or a product reference filter. An adult site filter may exclude any inappropriate content, such as sexual content, from being analyzed. A secure site filter may exclude any sensitive information, such as credit card information or personally identifying information from being analyzed. A language identification filter may determine that the user-generated content is not in a pre-designated language (e.g., English) and exclude the identified user-generated content from being analyzed. A product reference filter may identify any known product references in the user-generated content and exclude the identified content from being analyzed to reduce redundancy in processing the user-generated content.

The semantic processing engine 216 may use NER to process received content to identify product references. NER is the task of identifying and classifying the names of people, organizations, locations, and other entities (e.g., product references) within text. NER may include rule-based techniques, machine-learning based techniques, or hybrid methods that utilize both rule-based and machine-learning techniques. NER may include processing large and structured sets of data (which may be referred to as "corpus") using machine-learning techniques to learn terms and patterns commonly associated with entity classes by utilizing contextual, orthographic, linguistic, and external knowledge features. The corpus may be processed using conditional random fields (CRFs) on various product groups. CRFs are a class of statistical modeling method, which may be utilized in pattern recognition and machine learning, where they may be used for structured prediction. Structured prediction is a term associated with machine learning techniques that involve predicting structured objects.

In some embodiments, a cascading approach may be utilized, where a product trie may be used to generate entity candidates and a classifier may be used to classify the entity candidates.

In some embodiments, NER may include a heuristics-based classifier based on rules to identify specific fields, such as product name, depth of contributor match, presence in page title, number of occurrences, or the like.

In some embodiments, NER may include a mode of classification based on link extraction where product links are identified on web pages and their surrounding page structure, and determination is made as to whether the extracted links may be used as predictors of page content. In some embodiments, NER may include a template-based classification where portions of a web page are extracted on the page structure and combined into a product lookup.

In some embodiments, the NER may include using the above-described CRF approach in combination with a rescoring step, where the machine-learning techniques would be used to train all classifiers instead of a multinomial for product types.

In some embodiments, model combinations based on localized and general models may be used. Reranking approaches may be used to improve the product resolution. Joint models for extraction and resolution may be used by machine-learning a latent set of records and a record-message alignment simultaneously. Classifier combinations may be used where multiple approaches are identified for pages belonging to a particular domain.

The product identification engine 220 may include computer-executable instructions that in response in response to execution by the processor(s) 202 cause operations to be performed including receiving words or phrases identified by the semantic processing engine 216 and identifying product references based at least in part on the identified words or phrases. The product identification engine 220 may identify multiple product references that may be associated or relevant to the identified words or phrases and calculate a confidence score to be associated with each of the words or phrases. The confidence score may be based at least in part on historic data that may be stored in the semantic processing server 106 or a data store associated with the semantic processing server 106. In some embodiments, historic data may include data previously processed by the semantic processing server 106. In some embodiments, historic data may include data previously received and processed by the semantic processing server 106 for the user. The processed words or phrases identified by the semantic processing engine 216 may be compared to the historic data. In some embodiments, the confidence score may be calculated by comparing the processed words or phrases to historic data to determine how similar the processed words or phrases to the previously processed historic data. The product identification engine 220 may retrieve data associated with the identified product references. In some embodiments, the data associated with the identified product references may be retrieved from one or more product data repositories 110. The product identification engine 220 may then transmit the one or more identified product references, data associated with the product references, and their associated confidence scores to the front end server 104 or user device 102 for presentation to the user.

Within the data storage 204, one or more modules may be stored. As used herein, the term module may refer to a functional collection of instructions that may be executed by the one or more processors 202. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Figure 3:
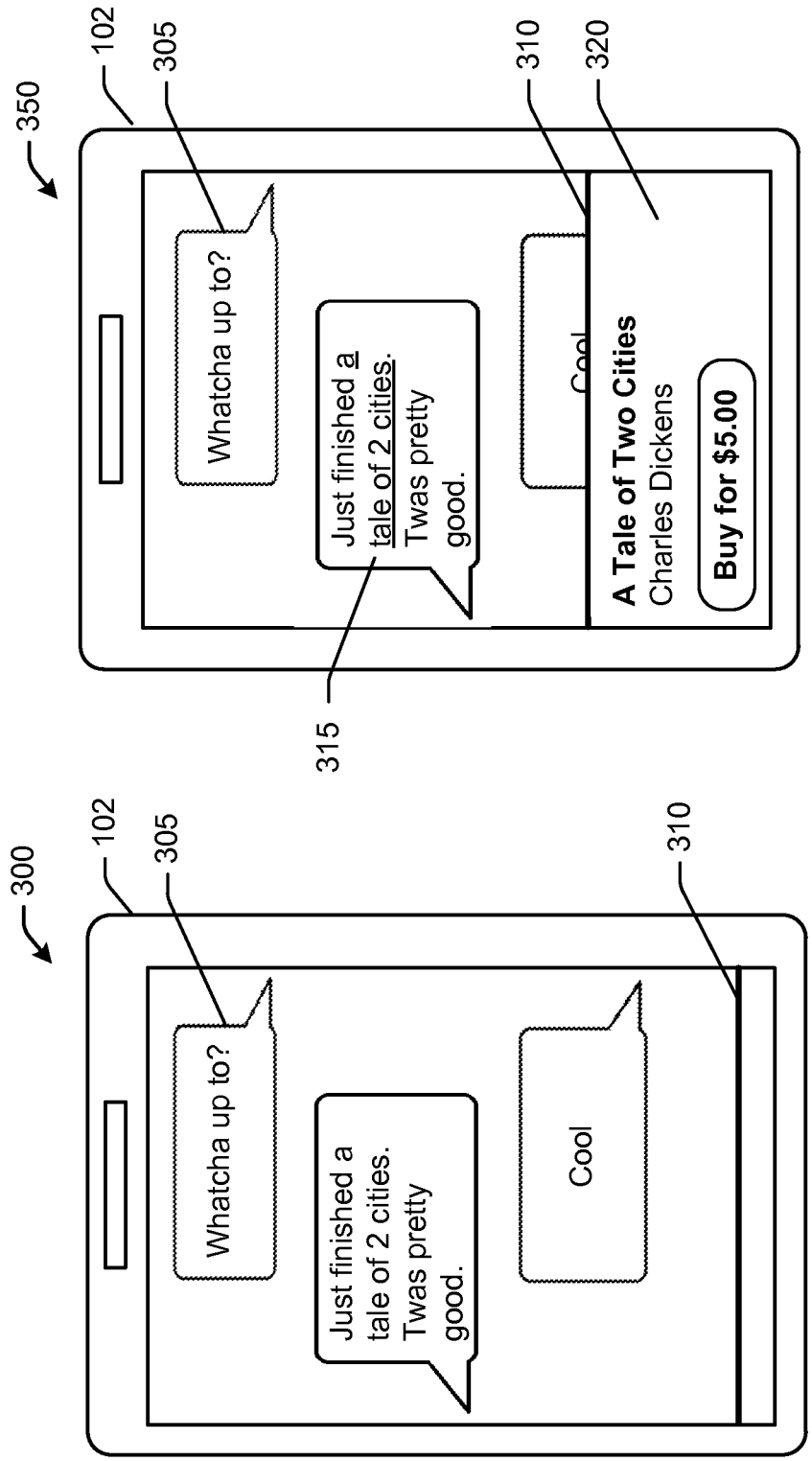
FIGS. 3A-3B illustrate a user device and presentation of a product advertisement based on semantic processing of user-generated content for product identification in accordance with an embodiment of the disclosure.

FIGS. 3A-3B illustrate a user device 102 and presentation 300, 350 of a product advertisement based on semantic processing of user-generated content for product identification in accordance with an embodiment of the disclosure. In FIG. 3A, the user device 102 displays multiple text messages 305. 310 is a visual indicator indicating that the semantic processing agent 114 is executing in the background. FIG. 3B depicts the presentation of identified product references to the user in the form of an advertisement. In some embodiments, the visual indicator 310 may slide out to display a preview of the identified product reference or an advertisement 320. The visual indicator 310 may slide out when the user scrolls the user-generated content (e.g., email or text messages 305) and the product reference comes into the main portion of the viewing window. The user may tap on the visual indicator to dismiss the product mention and return to the state depicted in FIG. 3A. The user may tap on the button to be directed to the store to purchase or view the displayed product. In some embodiments, the phrase 315 in the user-generated content may be altered or decorated to indicate that the phrase has been identified. For instance, the phrase 315 in the user-generated content may be underlined, bolded, or otherwise visually altered. The visual alteration may be in a coordinated schematic (e.g., similar color scheme) as the visual indicator 310 to indicate to the user that the visual indicator and the phrase 315 are associated.

In some embodiments, a word or phrase may be identified in content and altered to identify the product reference. The identified product reference may be presented to the user in the form of an in-text advertisement, which may include advertisements or data associated with the product depicted as hyperlinks within existing text of the user-generated content. In some embodiments, if a user hovers over an in-text advertisement, a bubble or hover-over window may be presented with a data associated with the product reference. In some embodiments, the in-text product reference may be indicated by a double-underline. Selecting an in-text product reference may generate a pop-up window containing data associated with the identified product. In some embodiments, the product references may be displayed to the user when the identified word or phrase are within a designated portion of the viewing window and may be minimized or removed from the viewing window when the identified word or phrase is outside of the designated portion of the viewing window. In some embodiments, the identified product reference may be displayed in a webpage or other presentation that may be accessed by the user at a later time.

In some embodiments, the identified product reference may be depicted in the content via a hyperlink. The hyperlink may direct the user to a webpage associated with the identified product or may direct the user to an overlay of the content. In some embodiments, the identified product reference may be decorated (e.g., visually altered). If a user hovers over the identified product reference on a user device 102 by hovering their finger over the product reference, the user may be directed to a webpage associated with the identified product reference or an overlay of the content. In some embodiments, in addition to the identified product reference being presented to the user through a visual alteration of the content, such as text decoration, the identified product reference may also be presented with a badge or icon indicating that the identified product reference is associated with an entity, such a company or webpage.

Illustrative Processes

Figure 4:
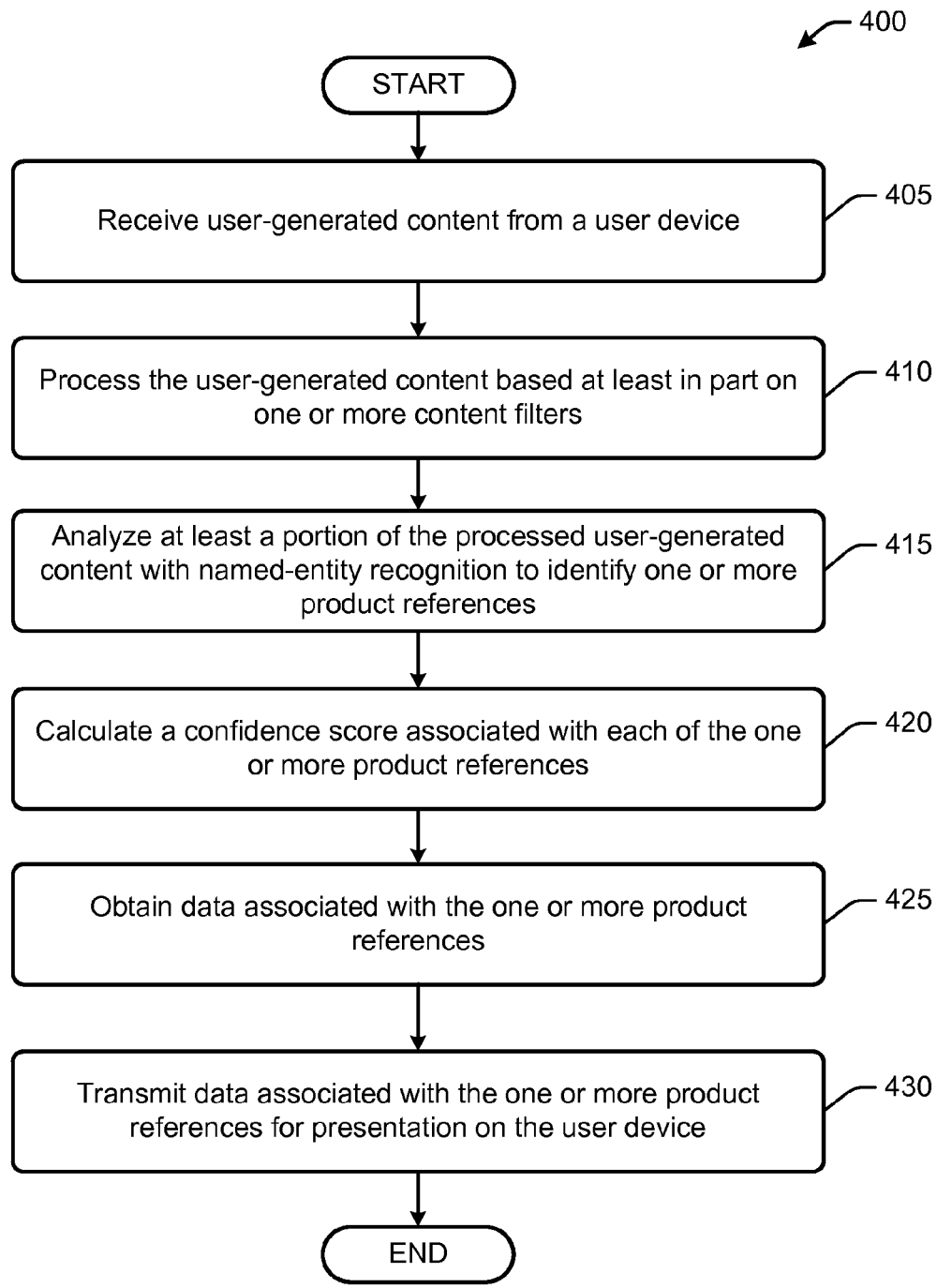
FIG. 4 is a process flow diagram of an illustrative method for semantic processing of content for product identification in accordance with an embodiment of the disclosure.

FIG. 4 is a process flow diagram of an illustrative method 400 for semantic processing of user-generated content for product identification in accordance with an embodiment of the disclosure. At block 405, user-generated content may be received from a user device 102 by the semantic processing server 106. In some embodiments, the user-generated content may be generated by the user device 102 and transmitted to the front end server 104. The front end server 104 may then transmit the request to the semantic processing server 106. In some embodiments, the user-generated content may be stored in a data repository associated with the front end server 104 and a link to the stored user-generated content may be transmitted to the semantic processing server 106.

At block 410, the user-generated content may be processed based at least in part on one or more content filters 218. The content filters 218 may include one or more of the following: an adult site filter, a secure site filter, a language identification filter, or a product reference filter. The adult site filter may identify and exclude any inappropriate content, such as sexual content, from being analyzed. The secure site filter may identify and exclude any sensitive information, such as credit card information or personally identifying information (e.g., social security number or driver's license number) from being analyzed. The language identification filter may determine that the user-generated content is not in a pre-designated language (e.g., English) and exclude the identified user-generated content from being analyzed. In some embodiments, the language identification filter may identify the language used in the user-generated content and may generate a request to analyze the user-generated content based at least in part on the identified language. The product reference filter may identify any known product references in the user-generated content and exclude the identified content from being analyzed to reduce redundancy in processing the user-generated content. The content filters 218 may be stored locally on the semantic processing server 106 or may be stored in a data store associated with the semantic processing server 106 and retrieved when necessary.

At block 415, at least a portion of the processed user-generated content may be analyzed to identify one or more product references. The processed user-generated content may be a pruned down version of the received user-generated content, after portions of the content have been excluded from analysis after application of one or more content filters 218. The processed user-generated content may be analyzed using machine learning techniques and historic data (e.g., previously analyzed data). The semantic processing engine 216 may analyze the processed user-generated content to identify words or phrases that may be product references. The semantic processing engine 216 may apply NER techniques, as described above, to determine that the identified words or phrases are references to products, services, additional content, or the like.

At block 420, a confidence score associated with each of the one or more product references may be calculated. The confidence scores may be calculated by the semantic processing engine 216 or the product identification engine 220 and based at least in part on historic data that may be stored in the semantic processing server 106 or a data store associated with the semantic processing server 106. For example, the confidence score may be determined by comparing the identified word or phrase to processed words or phrases. The semantic processing engine 216 or the product identification engine 220 may determine that the identified word or phrase are similar to the processed words or phrases and calculated the confidence score reflecting a likelihood that the identified word or phrase are related or similar to the previously processed words or phrases.

At block 425, the data associated with the product may be obtained. The product identification engine 220 may obtain data associated with the identified product references. In some embodiments, the data associated with the identified product references may be retrieved from one or more product data repositories 110. The product identification engine 220 may then transmit the one or more identified product references, data associated with the identified product references, and confidence scores associated with the identified product references to the front end server 104 or user device 102 for presentation to the user. Data associated with the identified product references may include additional information associated with the identified product, such as price, availability, delivery estimate, or the like. In some embodiments, the data associated with the identified product reference may be further details for additional content. For example, the product identification engine 220 may determine that a word or phrase is a reference to a movie or song and retrieve a trailer associated with the movie or a clip of the song.

At block 430, the data associated with the product may be transmitted for presentation on the user device. In some embodiments, the semantic processing server 106 may transmit the data associated with the product and the confidence score for each of the one or more product references to the front end server 104, if available. In some embodiments, the semantic processing server 106 may transmit the data associated with the product reference and the confidence scores for each of the one or more product references to the user device 102 for presentation to the user.

Figure 5:
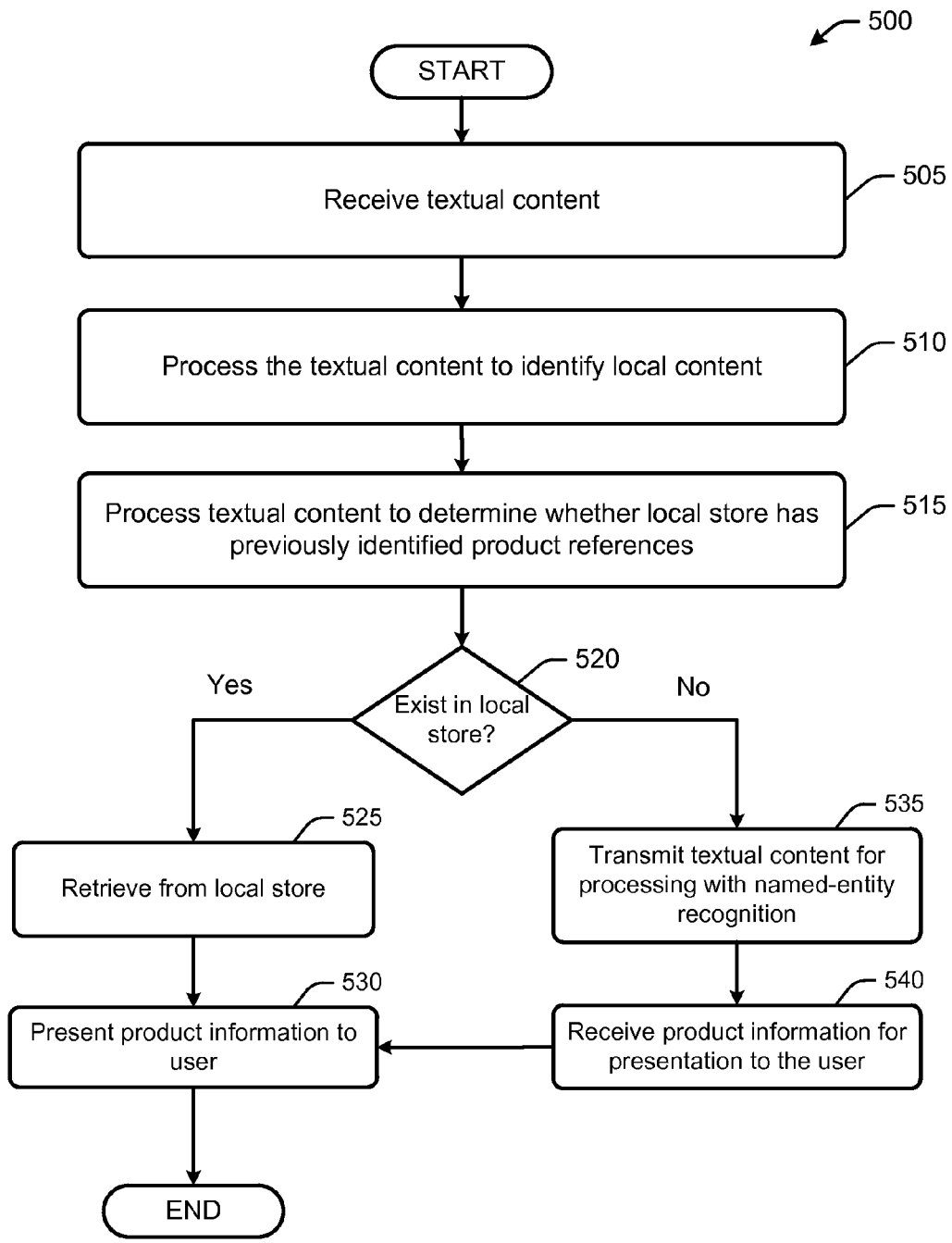
FIG. 5 is a process flow diagram of an illustrative method for semantic processing of content for product identification on a user device in accordance with an embodiment of the disclosure.

FIG. 5 is a process flow diagram of an illustrative method for semantic processing of textual content for product identification on a user device in accordance with an embodiment of the disclosure. Textual content may include user-generated content and/or professionally developed content.

At block 505, the semantic processing agent 114 may receive textual content from an application 112 on the user device 102.

At block 510, the local identification module 116 may process the textual content to identify local content. Local content may include data stored on the user device 102, such as a phone number, address, email address, or note. In response to identifying local content, the local content may be presented to the user by the semantic processing agent 114. The local identification module 116 may process the textual content and identify a word, phrase, or number in a text message. For example, the local identification module 116 may process a text message that states "hey sis. meeting dan at 4. want to join?" The local identification module 116 may determine "dan" as a name and may search the user device 102 to locate a contact associated with the first name "Dan". The local identification module 116 may identify one or more contacts with a first name "dan" and present the different contacts to the user. The local identification module 116 may determine that "at 4" corresponds to 4:00 PM on the current day, identify a calendar event for 4:00 PM on the current date, and present the calendar event to the user.

At block 515, the remote identification module 118 may process the textual content to determine whether a local storage 122 on the user device 102 has previously identified product references. In some embodiments, the remote identification module 118 may parse the textual content and compare the data to data that may be available in the local storage 122.

At block 520, a determination may be made whether data associated with a previously identified product reference exists in the local storage 122. If yes, then at block 525, the semantic processing agent 114 may retrieve the data associated with the previously identified product reference from the local storage 122. At block 530, the semantic processing agent 114 may facilitate presentation of the product information to the user.

If at block 520, a determination is made that no previously identified product information exists in the local store, then at block 535, the remote identification module 118 may transmit the textual content for semantic processing for product identification. In some embodiments, the user device 102 may transmit the request to process the user-generated content to one or more front end servers 104. In some embodiments, the front end server 104 may be optional and the user device 102 may transmit the request and the user-generated content for semantic processing to the semantic processing server 106.

At block 540, the semantic processing agent 114 may receive data associated with one or more identified product references for presentation to the user. In some embodiments, the semantic processing agent 114 may receive confidence scores associated with each of the one or more identified product references. Based at least in part on the confidence scores, the semantic processing agent 114 may determine which of the identified product references should be presented to the user and how the identified product references should be presented. For example, the semantic processing agent 114 receives three identified product references, the semantic processing agent 114 may analyze the confidence score, user preferences, historic behavioral data associated with the user, or any combination thereof, to determine which of the three identified product references to present to the user. Additionally, the semantic processing agent 114 may determine which format to present the identified product. For example, the identified product may be presented in an embodiment as depicted in FIGS. 3A-3B. In some embodiments, the identified product may be presented as an in-line advertisement, an overlay, or in a central location, such as a web portal or the like.

In some embodiments, the semantic processing agent 114 may store the received data associated with the identified product and the confidence score associated with the identified product and store them in the local storage 122 of the user device 102. The semantic processing agent 114 may retrieve the stored data as discussed in relation to block 525.

At block 530, the semantic processing agent 114 may facilitate presentation of the received data associated with the identified product to the user. The user may select the presented identified product, such as by clicking on a hyperlink or selecting a button to be directed to a webpage that may have further information associated with the identified product. The user may choose to ignore the presented identified product, which in some embodiments, would minimize the presented identified product if the user scrolls away from the word or phrase in the user-generated content associated with the identified product.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   receiving user-generated text content from a user device, the user-generated text content comprising a first portion and a second portion;
   determining, using one or more content filters, that the first portion of the user-generated text content comprises personal identifying information;
   preventing the first portion from being analyzed with named-entity recognition;
   analyzing the second portion with named-entity recognition to identify one or more product references;
   calculating a confidence score associated with each of the one or more product references;
   obtaining data associated with the one or more product references;
   modifying the user-generated text content to include a link to the data, wherein the second portion is presented as the link;
   selecting a format in which to present the data; and
   transmitting formatting information for the format and the modified user-generated text content for presentation on the user device, wherein the data is accessible in the format by interacting with the second portion.

2. The non-transitory computer-readable medium of claim 1, wherein the data associated with the one or more products references comprises at least one of an advertisement for the one or more products or a hyperlink to a product page associated with the one or more product references, wherein the hyperlink is the link.

3. The non-transitory computer-readable medium of claim 1, wherein the user-generated text content is one of a text message, an email, a message, a note, social media text content, or text content associated with a user application.

4. The non-transitory computer-readable medium of claim 1, further comprising transmitting the confidence score for each of the one or more products references.

5. A computer-implemented method comprising:
   receiving, by one or more computers, first textual content comprising a group of one or more words;
   processing, by the one or more computers, the first textual content with named-entity recognition to identify at least two product references;
   calculating, by the one or more computers, a confidence score for the at least two product references, wherein the confidence score is indicative of a relevance of the respective product reference to the first textual content;
   determining that a first confidence score for a first product reference is a highest confidence score;
   obtaining, by the one or more computers, data associated with the first product reference;
   modifying the first textual content to form second textual content, wherein the second textual content comprises the group of one or more words and a link to the data; and
   transmitting, by the one or more computers, the second textual content instead of the first textual content.

6. The computer-implemented method of claim 5, wherein obtaining the data associated with the first product reference comprises obtaining, by the one or more computers, the data associated with the first product reference from one or more product data repositories.

7. The computer-implemented method of claim 5, wherein processing the first textual content further comprises pruning, by the one or more computers, the first textual content using one or more content filters.

8. The computer-implemented method of claim 7, wherein the one or more content filters comprise at least one of an adult site filter, a secure site filter, a language identification filter, or a product reference filter.

9. The computer-implemented method of claim 5, wherein calculating the confidence score is based at least in part on historic processed textual data associated with a user for the first product reference.

10. The computer-implemented method of claim 5, wherein the first textual content is one of a text message, an email, a message, a note, social media text content, or text content associated with a user application.

11. The computer-implemented method of claim 5, further comprising storing the processed first textual content in association with the data associated with the product reference as historic data associated with a user.

12. A system comprising:
   at least one memory storing computer-executable instructions; and
   at least one processor, wherein the at least one processor is configured to access the at least one memory and to execute the computer-executable instructions to:
      receive user-generated text content from an application, the user-generated text content comprising a group of one or more words;

transmit the user-generated text content to a server;

receive data associated with an identified product reference from the server, wherein the identified product reference is selected from a set of product references using respective confidence scores, wherein the confidence scores are indicative of a relevance of the respective product reference to the user-generated text content;

modify the user-generated text content to form modified content, wherein the modified content comprises the group of one or more words and a link to the data; and cause presentation of the modified content instead of the user-generated text content.

13. The system of claim 12, wherein the at least one processor is further configured to execute the computer-executable instructions to:

process the user-generated text content to identify a word, phrase, or number;

retrieve local content based at least in part on the word, phrase or number, wherein the local content comprises locally stored data; and cause presentation of the local content to the user.

14. The system of claim 12, wherein the at least one processor is further configured to execute the computer-executable instructions to:

receive a first confidence score associated with the identified product reference and a second confidence score associated with a second product reference, wherein the first confidence score is greater than the second confidence score.

15. The system of claim 14, wherein the at least one processor is further configured to execute the computer-executable instructions to:

cause presentation of the modified content based at least in part on at least one of the first confidence score, user-preference, or historic behavioral data associated with the user.

16. The system of claim 14, wherein the first confidence score is based at least in part on historic data associated with the identified product reference.

17. The system of claim 12, wherein the user-generated text content is one of a text message, an email, a message, a note, social media text content, or text content associated with a user application.

18. The system of claim 12, wherein the at least one processor is further configured to execute the computer-executable instructions to:

process the user-generated text content to determine that a local storage comprises data associated with a previously identified product reference; and retrieve data associated with the previously identified product reference from the local storage.

19. The system of claim 18, wherein the server uses named-entity recognition to identify the previously identified product reference.

20. A non-transitory computer-readable medium storing computer-executable instructions which, when executed by a processor, cause the processor to perform operations comprising:

receiving a request for first content from a user device;

obtaining the first content from a content server;

transmitting the first content to a semantic processing server;

receiving data associated with at least two product references, wherein the first content comprises a group of one or more words;

modifying the first content based at least in part on the data associated with a first product reference of the one or more product references to form second content, wherein the second content comprises the group of one or more words and a link to the data, and wherein the first product reference is selected from a set of product references using respective confidence scores, the confidence scores indicative of a relevance of the respective product reference to the first content; and transmitting the second content to the user device instead of the first content.

* * * * *